INVENTORS
DEWEY M. EVANS
FREDERICK W. KOEPKE Jr.
BY

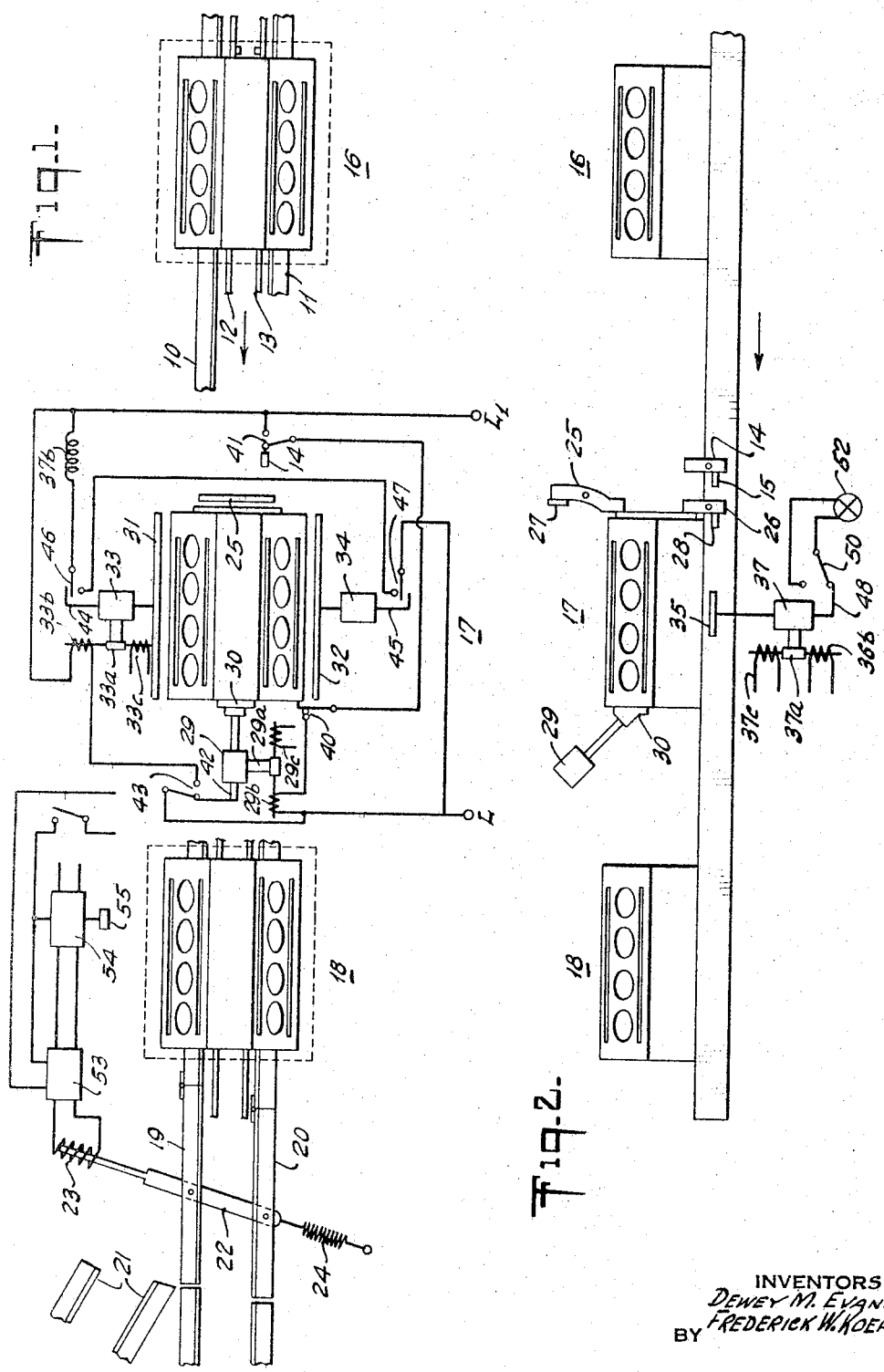

ATTORNEYS

April 11, 1967      D. M. EVANS ETAL      3,313,143

APPARATUS FOR LEAK TESTING CASTINGS

Original Filed Dec. 10, 1958      6 Sheets-Sheet 4

INVENTORS
*Dewey M. Evans*
*Frederick W. Koepke Jr.*
BY

ATTORNEYS

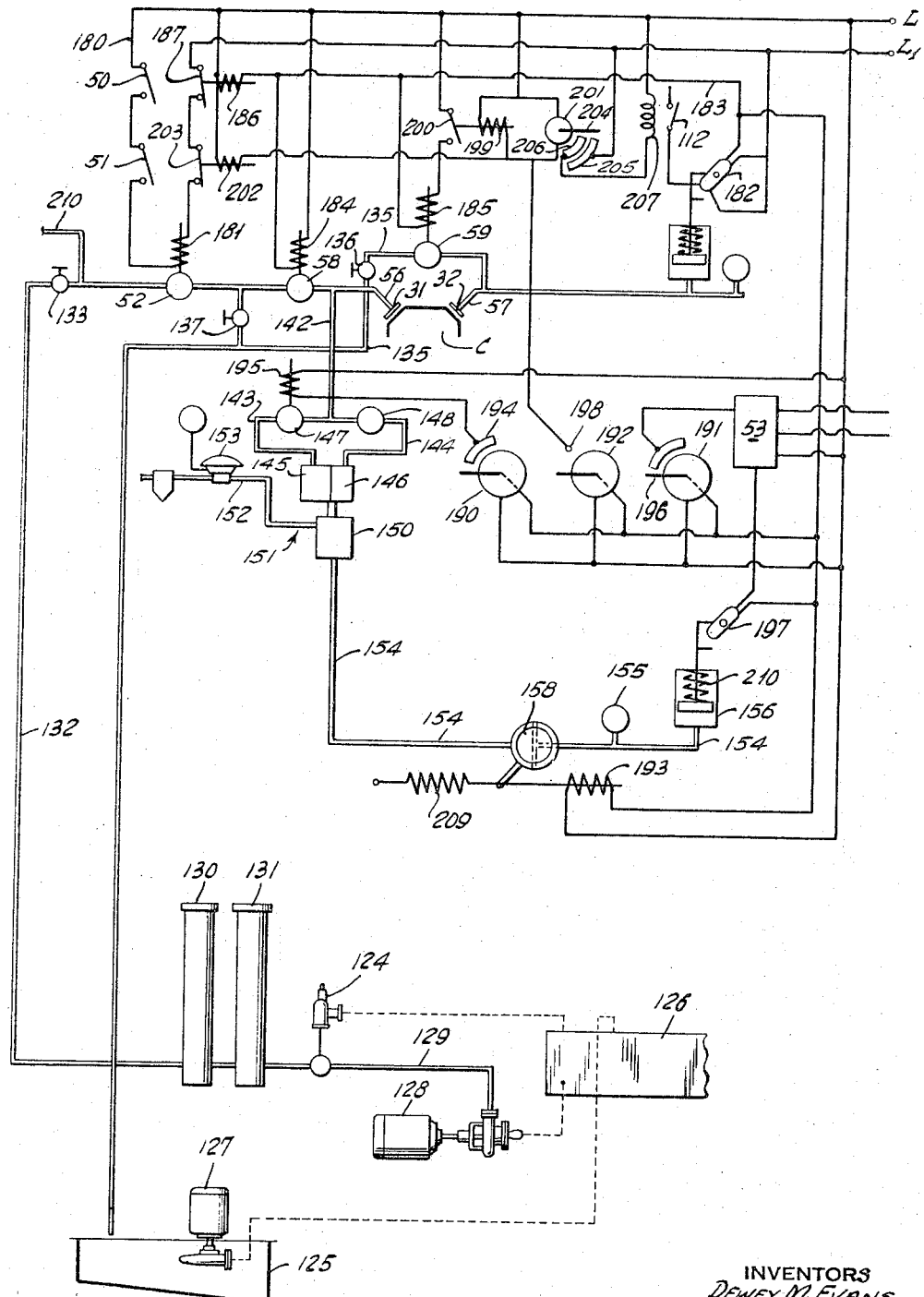

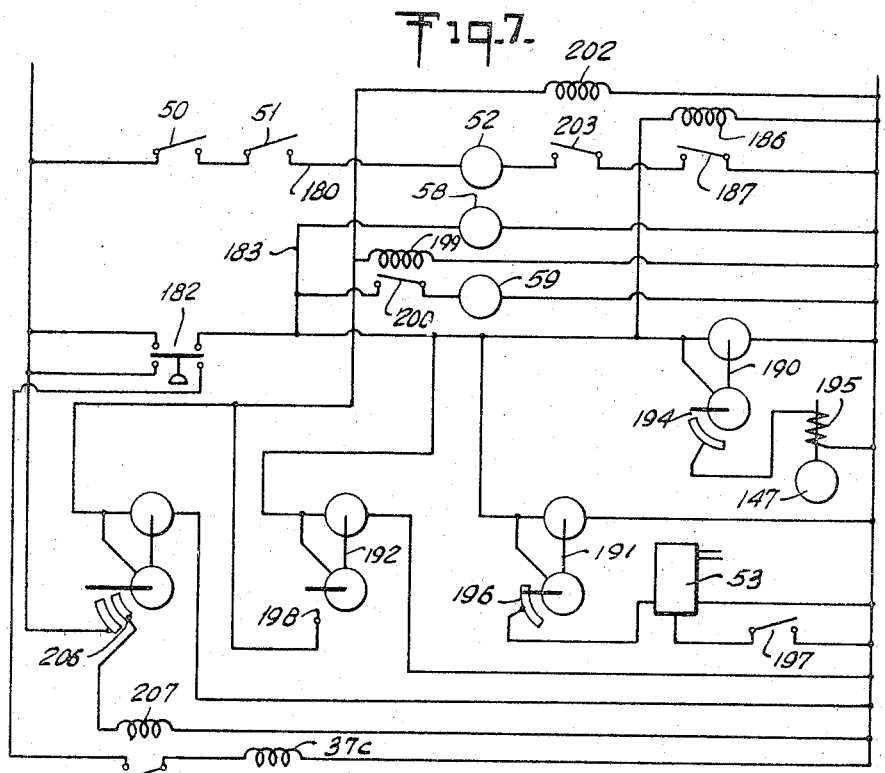
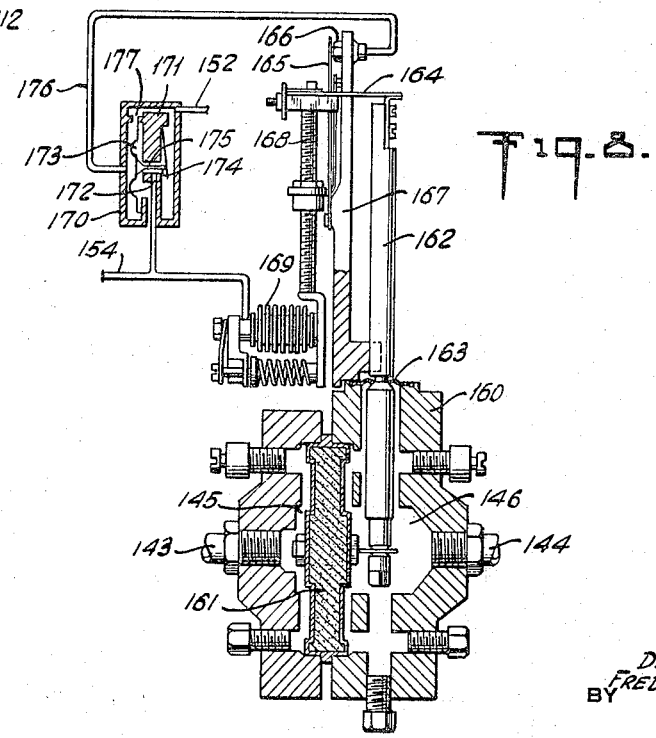

United States Patent Office 3,313,143
Patented Apr. 11, 1967

3,313,143
APPARATUS FOR LEAK TESTING CASTINGS
Dewey M. Evans, Plymouth, and Frederick W. Koepke, Jr., Detroit, Mich., assignors to Ajem Laboratories, Inc., Livonia, Mich., a corporation of Michigan
Original application Dec. 10, 1958, Ser. No. 779,349, now Patent No. 3,221,539, dated Dec. 7, 1965. Divided and this application June 10, 1965, Ser. No. 477,058
10 Claims. (Cl. 73—41)

This is a division of application Ser. No. 779,349 filed Dec. 10, 1958 now Patent 3,221,539.

The present invention relates to a method of and apparatus for testing castings for leaks.

One of the faults of metal parts made by casting is the occurrence of imperfections which permit gas or liquid to leak from a confined chamber or chambers formed therein. Because of the possibility of such imperfections in castings used for confining fluids it is necessary to test them for leaks. When testing for leaks the primary objective is to determine whether a leak exists and if a leak exists to determine if it is so large as to prevent use of the casting or is a small circuitous crevice or path which effectively confines liquid or gas under pressure.

It is obviously important that leaks be found in castings before the castings are assembled. Otherwise, the cost of replacing a leaking casting is greatly multiplied. For example, if a leaking engine block casting is assembled with the other parts of an automobile and shipped to a dealer who, in turn, sells and delivers the complete automobile to a customer before the leak is discovered, the cost of replacement of such a block usually exceeds the cost of the casting and may exceed the profit on the complete automobile. This is especially true in view of the present day cost of labor and transportation and complicated construction of an automobile engine which must be disassembled in the field. Another equally important need for finding leaking castings before assembly is the manufacture-customer relationship. A leaky casting in an automobile delivered to a customer adversely affects present and future sales. The time required and the nuisance resulting from the replacement of a defective casting in the field usually results in the customer being dissatisfied and hurts the reputation of the manufacturer. It is, therefore, essential that leaking castings should be discovered before assembly.

Prior methods and apparatus for leak testing castings are far from satisfactory. One of the principal deficiencies of prior leak testing methods and apparatus are their lack of sensitivity in detecting small leaks. As a result many castings are passed by the conventionally used methods and apparatus which are later found to leak after the casting has been machined and assembled. Another fault of conventional testing apparatus is that the testing of each casting requires a considerable period of time. As a result, castings must be diverted from a production line to a plurality of testing stations to maintain the normal flow of parts and such diversion involves more labor and handling in addition to the cost of the equipment at the several testing stations. A number of prior testing methods and apparatus utilize a testing fluid at high pressure of the order of 500 pounds to 1,000 pounds per square inch within is inherently dangerous in operation. One such method consists of applying air at high pressure to the walls of a casting while immersed in a liquid. It has been thought that such faults in existing methods and apparatus might be avoided by testing each casting for a longer period of time to obtain a better estimate of the magnitude of a leak, but such testing for longer periods interferes with the production rate and there is considerable question as to whether the magnitude of a leak, even when tested for a longer period of time, can be determined with sufficient accuracy to be meaningful with existing equipment. In this connection another fault in previously used leak methods and apparatus is the human error in detecting and evaluating the size of a leak.

One of the objects of the present invention is to provide a method of and apparatus for testing castings which insures the detection of and the magnitude of a leak with far greater accuracy than can be obtained by conventional methods and apparatus for testing.

Another object is to provide a method of and apparatus for testing castings for leaks which will accurately detect a leak in a casting in a few seconds during its movement in a mass production line.

Another object is to provide a method of and apparatus for testing castings for leaks which operate at a relatively low pressure to reduce the possibility of serious accidents.

Another object is to provide a method of and apparatus for leak testing castings which are adapted to perform the test and alternately accept or reject the casting to eliminate human error in evaluating test results.

Another object is to provide a method of testing castings for leaks by measuring the difference in pressure resulting from the flow of a fluid through the wall of a casting during a short predetermined period of time.

Another object is to provide the method of testing castings for leaks which avoids a false indication of a leak due to dirt or other foreign material being forced into and closing a small opening in the casting wall.

Another object is to provide an apparatus for testing castings for leaks which automatically feeds the castings to and from a testing station and connects the casting to the testing apparatus.

Another object is to provide leak testing apparatus of the type indicated which is operated responsive to the movement of a casting to a testing station to rigidly clamp the casting for testing and operated in response to completion of the test to release the casting.

Another object is to provide an apparatus of the type indicated in which a testing mechanism is operated automatically to test a casting for leaks, initiate operation of mechanism to accept or reject the tested casting and then re-set the mechanism for testing the next casting.

Another object is to provide an apparatus of the type indicated which is automatically operable to form a closed chamber on one side of the walls of the casting, supply a testing fluid to the closed chamber and sense any leakage from the closed chamber to reject the casting.

Still another object is to provide an apparatus of the type indicated which is of a rugged compact construction, reduces the handling and labor required and the cost of testing a casting and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

In the drawings:

FIGURE 1 is a plan view of an apparatus in a production line for testing castings for leaks in accordance with the method of the present invention;

FIGURE 2 is a side elevational view of the apparatus illustrated in FIGURE 1 and showing a casting clamped in position for a leak test at the testing station;

FIGURE 5 is a diagrammatic view of the hydraulic system and controls for successively actuating the end, top and bottom closures to closing and opening positions;

FIGURE 6 is a diagrammatic view showing an apparatus for testing a casting for leaks in accordance with the method of the present invention;

FIGURE 7 is a diagrammatic view of the electric control circuit for controlling the operation of the testing apparatus; and FIGURE 8 is a sectional view of the instrument used for sensing a leak in a casting and producing a signal for accepting or rejecting a casting.

METHOD

Figure 3:
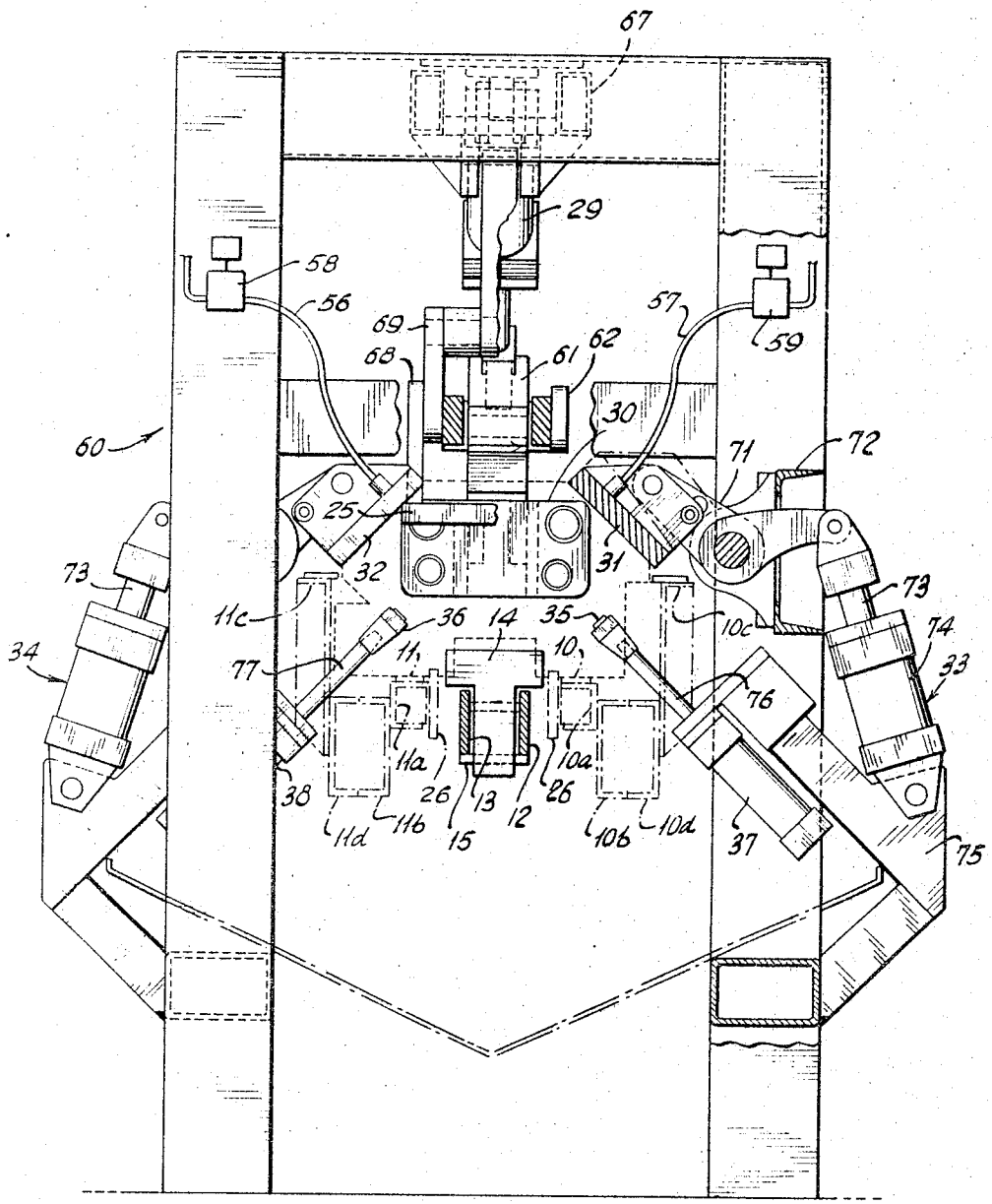
FIGURE 3 is an end elevational view of the apparatus at the testing station and showing the closure members for closing port openings in the end, sides and bottom of an automobile engine block.

The method of the present invention for leak testing castings may be performed manually, semi-automatically, or completely automatically. In general, the method comprises the steps of forming a closed chamber at one side of the walls of the casting to be tested. A difference in pressure then is produced between the closed chamber and the ambient atmosphere at the opposite side of the walls of the casting. After a predetermined period of time the pressure in the chamber, which will vary with any leakage through the wall of the casting, is compared with the initial pressure to determine if the casting leaks. As the pressure in the chamber is functionally related to the rate of flow through the leak, the difference in pressure after a predetermined time also will indicate the size of the leak. If there is no difference in pressure during the period of the test, the casting is accepted and if a difference in pressure does occur during that test, the magnitude of the difference in pressure may be used to classify the leak as small, medium or large.

The difference in pressure may be produced by supplying a fluid to the interior of the chamber under pressure or by evacuating the interior of the chamber. When the chamber is pressurized, the fluid may be a liquid, such as water, or preferably, a solution having a low surface tension and high wetting characteristics; or the fluid may be a gas, such as air, or one having a low molecular weight, such as hydrogen or helium, which will leak through an imperfection in a casting at a faster rate than one having a higher molecular weight.

When the leak testing method is performed manually, closures are clamped to the casting to form a chamber at one side of the wall thereof, a difference in pressure is produced between the chamber and ambient by a suitable pump, either to supply fluid thereto or evacuate fluid therefrom, and the chamber and test cells communicating therewith are closed off by manually operable valves in the connections to the chamber and between the chamber and one of the cells. After a predetermined period of time, the difference in pressure in the test cells is measured by a suitable instrument or instruments connected to the cells, such as pressure gauges or a differential indicator or recorder.

Preferably, the method is practiced in a production line by an automation system for intermittently advancing castings through successive stations including a testing station, automatically or semi-automatically testing each individual casting for leaks and accepting or rejecting the tested castings. Such an automation system avoids human errors in measuring the difference in pressure in the test cells or in interpreting the results of the measurement. When the test is performed automatically there is no manual control. When the test is done semi-automatically each test is initiated manually, but the entire testing operation and acceptance or rejection of a particular casting is automatic.

The steps of the method are hereinafter explained in detail when practiced in a fully automatic system, but it will be understood that any of the steps of the method can be performed manually. Furthermore, the method will be described for leak testing a jacketed automobile engine block forming a chamber in the casting for the flow of cooling water, but it will be understood that the method can be applied to castings of any shape and made of ferrous or nonferrous materials. In the automation system the engine block castings are progressively indexed to successive stations in a production line and dwell for a period of, for example, thirty seconds, at each station. Advantageously, the castings are thoroughly washed at some station preceding the testing station, either adjacent or located remotely therefrom, to clean any dirt from the interior and exterior walls of the casting. This step is necessary to insure that no dirt is present adjacent the port openings in the jacketed casting which are to be closed and to prevent any dirt from plugging any leaking crevice in the wall of the casting. The entry of dirt into any leaking crevice or cavity might produce a false indication that the casting does not leak. After washing and rinsing the wash solution is drained and preferably surplus wash solution is blown off the surface of the casting to remove dirt, but the surfaces may remain wetted with the wash solution to facilitate wetting during testing.

After the casting has been thoroughly cleaned, rinsed and semi-dried, it is automatically indexed to the testing station and the movement of the engine block to its testing position is utilized to automatically clamp the block and close all ports openings at the end, top and bottom of the casting. For example, the engine block may be moved slightly beyond its testing position and a port at the end of the block engaged by a resilient pad to close the port and bodily move the block rearwardly against stops to clamp the block in position. The other port openings in the engine jacket are then closed so as to provide a closed chamber at one side of the walls of the casting.

After the engine has been advanced to the testing station and the port openings closed to form a chamber on one side of the walls of the casting to be tested, the casting is leak tested as previously described. When liquid is used as a testing medium it is preferable to use a detergent solution having high wetting and penetrating characteristics. This testing medium may be, and advantageously is, the same solution used for washing the casting at the preceding station. The testing fluid is then supplied to the closed chamber through suitable connecting lines to completely fill the chamber. During the initial filling of the chamber with testing fluid, air is permitted to escape through a vent opening to insure a complete fillling of the chamber formed by the cavity in the casting and closures. When the fluid reaches a predetermined pressure in the chamber, for example 80 pounds per square inch, the chamber is sealed by closing the fluid inlet and vent lines to trap the fluid therein under pressure.

As stated above, the principle of the leak test is to determine the rate at which the confined fluid changes pressure in relation to the initial pressure as a standard. Therefore, the next step of the method is to determine the rate of pressure change in the chamber with respect to the initial pressure. For this purpose, the connecting line between the chamber and one of the test cells is closed to trap the fluid in one cell at the initial pressure of, for example, 80 pounds per square inch. The other test cell in communication with the chamber will remain constant if there is no leak in the wall of the casting and will decrease by an amount functionally related to the rate of leakage if a leak is present in the wall of the casting.

After a predetermined period of time the pressure in the two cells are compared to determine whether a leak exists and the size of the leak. The length of the period of delay required before sensing the difference in pressure in the cells is dependent upon the rate at which the testing liquid can permeate an opening in the wall of the casting constituting the leak. Where a fissure or hole is very small, the rate of wetting of the surface area of the fissure or hole becomes of principal importance. The pressure sustained on the liquid media also bears influence on how fast the pressure can change due to escape of the confined liquid. When a liquid solution having a high wetting rate with selected surfactant agents and with a low bulk viscosity of the solution, a more rapid escape of the liquid can be obtained with faster recognition of pressure change and the existence of some leakage will be indicated. Even though the wetting rate is fast and the viscosity low, finite times are required to produce a distinct increment change of pressure that may be recognized by sensitive instruments either visually or automatically. This time while finite is relatively small and with solutions having a high wetting rate and low viscosity the leak and its magnitude can be determined within 10 seconds.

Any difference in pressure is sensed and evaluated to determine whether the casting leaks and if it leaks to determine the size of the leak and whether or not the casting can be used. If the pressure change has been rapid it indicates that too large a leak exists and the part should be rejected for further observation, repair or scraping. Accordingly, such a casting is diverted from the production line. On the other hand, if there is no pressure change or the pressure change is small in the predetermined time of the test, the part is accepted and continues along the production line.

The acceptance or rejection of a casting is performed automatically to eliminate the human element in detecting a leak or evaluating size. Accordingly, any difference in pressure is sensed and evaluated by a mechanical pressure sensing instrument which, in turn, controls operation of a responsive mechanism to accept or reject the casting. This may be accomplished by utilizing the pressure sensing instrument to vary the pressure in a pneumatic system in accordance with the difference in pressure sensed and, in turn, control circuits in electronic control equipment to divert the casting from the production line if defective and advance the casting along the production line if accepted. As the engine block must proceed to further stations before it can be diverted, the electronic responsive equipment includes a memory device which operates the diverting mechanism to remove the defective casting from the production line. Thus, when the tested casting reaches a particular place along the production line in one, two or more stations away from the test station the electronic equipment controls operation of responsive equipment to accept or reject the casting.

After the casting has been accepted or rejected and the memory device actuated, a control is actuated to release the tested casting for advancement to the next station. The first step in releasing the casting is the opening of the vent valve from the closed chamber to release the pressure. This vent may remain open for a period of, for example, 10 seconds after which the closures are withdrawn to permit the testing fluid to drain from the recess in the casting. In addition to draining testing liquid from the casting the removal of the closures physically releases a casting so that it is free to be moved to the next station. After the major part of the testing liquid has drained from the casting, the indexing mechanism will have operated to advance the casting to the next station where it is tumbled to remove any remaining liquid and blown by air to remove all trapped liquid therefrom.

After release of the closures at the testing station, the sensing instrument and the sensing and responsive parts are reset automatically to adapt the testing equipment to receive and test the next casting advanced by the indexing mechanism. It will be obvious that the indexing of successive castings to the testing station, the operation of the closures to clamp and release a casting and the supplying of test fluid under pressure to the closed chamber on one side of the walls of the casting may be performed manually, but it is desirable to automatically sense any difference in pressure and evaluate the degree of the leak by automatically operating mechanical instruments to avoid human error in observing and evaluating the test results. The difference in pressure may be observed visually by pressure gauges responsive to variations in the pressure of the pneumatic system as a check on the automatic testing system.

When air is used as a testing medium the same steps are performed in the same sequence. In other words, the port openings in the engine block casting are closed, air under pressure is supplied to the closed chamber, the air under pressure is trapped in the casting and cells, one cell is sealed from the chamber and the other cell and the difference in pressure in the two cells is sensed automatically to operate responsive mechanism for accepting and rejecting the castings. Similarly, when the chamber is evacuated the difference in pressure resulting from leakage of gas through the casting into the chamber is sensed as a difference in pressure in the two cells and responsive mechanism is actuated to accept or reject the casting.

APPARATUS FOR ADVANCING CASTINGS

The drawings illustrate apparatus for automatically leak testing engine block castings C in accordance with the method of the present invention. FIGURES 1 and 2 of the drawings illustrate a pair of rails 10 and 11 constituting a production line along which the castings C to be tested are advanced. Between the rails are reciprocating bars 12 and 13 of an indexing mechanism which advance castings from one station of the next during their forward cycle of movement. As indicated diagrammatically in FIGURES 1 and 2, the bars 12 and 13 of the reciprocating mechanism have dogs 14 which engage stops 15 during their forward movement and are pivotally mounted thereon for rocking movement to an inoperative position during rearward movement. Thus, as the bars 12 and 13 move through a forward stroke the dogs 14 engage and advance a plurality of engine block castings C on rails 10 and 11 and as the bars move through a rearward stroke the dogs pivot on the bars and pass by a casting C. Such an indexing mechanism is described and claimed in copending applications of Emil Umbricht and Dewey Evans, Ser. No. 476,138, filed Dec. 20, 1954, now Patent No. 2,918,071 and Ser. No. 467,746, filed Nov. 9, 1954, now Patent No. 2,979,062.

FIGURES 1 and 2 also illustrate three successive stations 16, 17 and 18 of the production line through which the castings pass, but it will be understood that other stations may be provided in the production line before and after the three stations illustrated. The first station 16 is a washing station where the casting is washed, rinsed and tumbled in a manner illustrated and described in detail in copending application Ser. No. 476,138 referred to above. The station 17 adjacent station 16 is the testing station where the castings are tested for leaks. Station 18 is a station similar to the station 16 where the casting is tumbled and air blown to remove all traces of the testing fluid. Beyond the station 18 the rails 10 and 11 have switch sections 19 and 20 which may be moved into alignment with rails of a spur track 21 for diverting a defective casting from the main track. Switch rails 19 and 20 may be connected by a bar 22 operated in one direction by an electric motor 23 illustrated as a solenoid and in the opposite direction by a spring 24.

Pivoted stop dogs 25 and 26 are provided at the testing station 17 which are located adjacent the top and bottom of a casting C to be tested and are similar to the dogs 14 on the bars 12 and 13. Each of the stop dogs 25 and 26 are mounted to pivot intermediate their ends to permit the casting C to advance therebetween, but engage the rearward side of the casting when moved in the opposite or rearward direction and abutments 27 and 28 which prevent pivotal movement in a rearward direction. A hydraulic ram 29 operates an end closure 30 to engage the forward end of the casting C to be tested and bodily move the casting against the stop dogs 25 and 26 to clamp the casting therebetween and rigidly hold it in position for testing. Top closure members 31 and 32 also are provided at opposite sides of the casting adjacent the top thereof and these closure members, in turn, are operated by hydraulic rams 33 and 34 to engaging and releasing positions at the top of the casting C. As shown in FIGURE 2, a closure 35 and a similar closure 36 not shown, are operated by hydraulic rams 37 and 38 to close openings in the bottom of the casting. The hydraulic ram 29 and pairs of rams 33, 34 and 37, 38 each have a solenoid operated control valve 29a, 33a and 37a. Valves 29a, 33a and 37a control operation of the hydraulic rams in opposite direction to operate the closures 30, 31, 32, 35 and 36 to closing position and open position, respectively.

Hydraulic ram 29 and pairs of rams 33, 34 and 37, 38 are operated automatically in sequential order by an electric control circuit having solenoids for operating the control valves 29a, 33a and 37a. The electric control circuit comprises a switch 40 actuated to closed position by the movement of the engine block casting into the testing zone and a switch 41 actuated by a dog 14 on the indexing bar 22 during its rearward movement. Switches 40 and 41 are connected in series with a solenoid winding 29b between the power lines L and L1. Solenoid 29b is connected to actuate the valve 29a of the hydraulic ram 29 to supply hydraulic fluid to one side of its piston to actuate the closure member 30 into engagement with a port opening in the end of the casting C and bodily move the engine block casting rearwardly against the stops 25 and 26 and thereby clamp the engine block in position for testing. Hydraulic ram 29 has an actuator 42 connected to its piston which closes a switch 43 during its last increment of movement to clamp the engine block casting C in position for testing.

Switch 43 connects a solenoid winding 33b across power line L and L1. Solenoid 32b actuates valve 33a for hydraulic rams 33 and 34 to move the closures 31 and 32 into engagement with the top of the engine block casting C to close the ports therein. Each of the hydraulic rams 33 and 34, in turn, has an actuator 44 and 45 movable with its respective piston to actuate switches 46 and 47 to close position. Switches 46 and 47 are connected in series with a solenoid winding 37b between the power lines L and L1 for actuating valve 37a for the hydraulic rams 37 and 38 to move the closures 35 and 36 into engagement with port openings in the bottom of engine block casing C which are adapted for connection to the water circulating lines for the engine. Hydraulic rams 37 and 38 have actuators 48 and 49 operated by the pistons therein, see FIGURES 2 and 6, for closing switches 50 and 51 connected in series across the power lines L and L1 for energizing the solenoid of a supply valve 52 for automatically initiating operation of a leak test on the casting, as later explained in detail. Thus, the movement of the engine block casting C into position initiates operation of the ram 29 to actuate the closure 30 which, in turn, initiates operation of the other pairs of closures 31, 32 and 35, 36, successively, to form a closed chamber in the casting to be tested and initiate a testing operation. As shown in FIGURES 1 and 2, each of the control valves 29a, 33a and 37a for the hydraulic ram 29 and pairs of rams 33, 34 and 37, 38 has another solenoid 29c, 33c and 37c for actuating the valves to move the closures successively in the reverse order from that explained above and released the casting, as will be more fully understood from the detailed description of the hydraulic system illustrated in FIGURE 5.

An electronically operated responsive mechanism also is shown in FIGURE 1 comprising a memory device 53 for storing information sensed at the testing station 17 and controlling the operation of the solenoid 23 to operate the track switches 19 and 20 when a casting is rejected. This electronically operated responsive device 53 also includes an electrically operated printing mechanism 54 having a plate 55 for stamping a casting rejected when a leak is indicated at the testing station.

CONSTRUCTION OF CLOSURES

Figure 4:
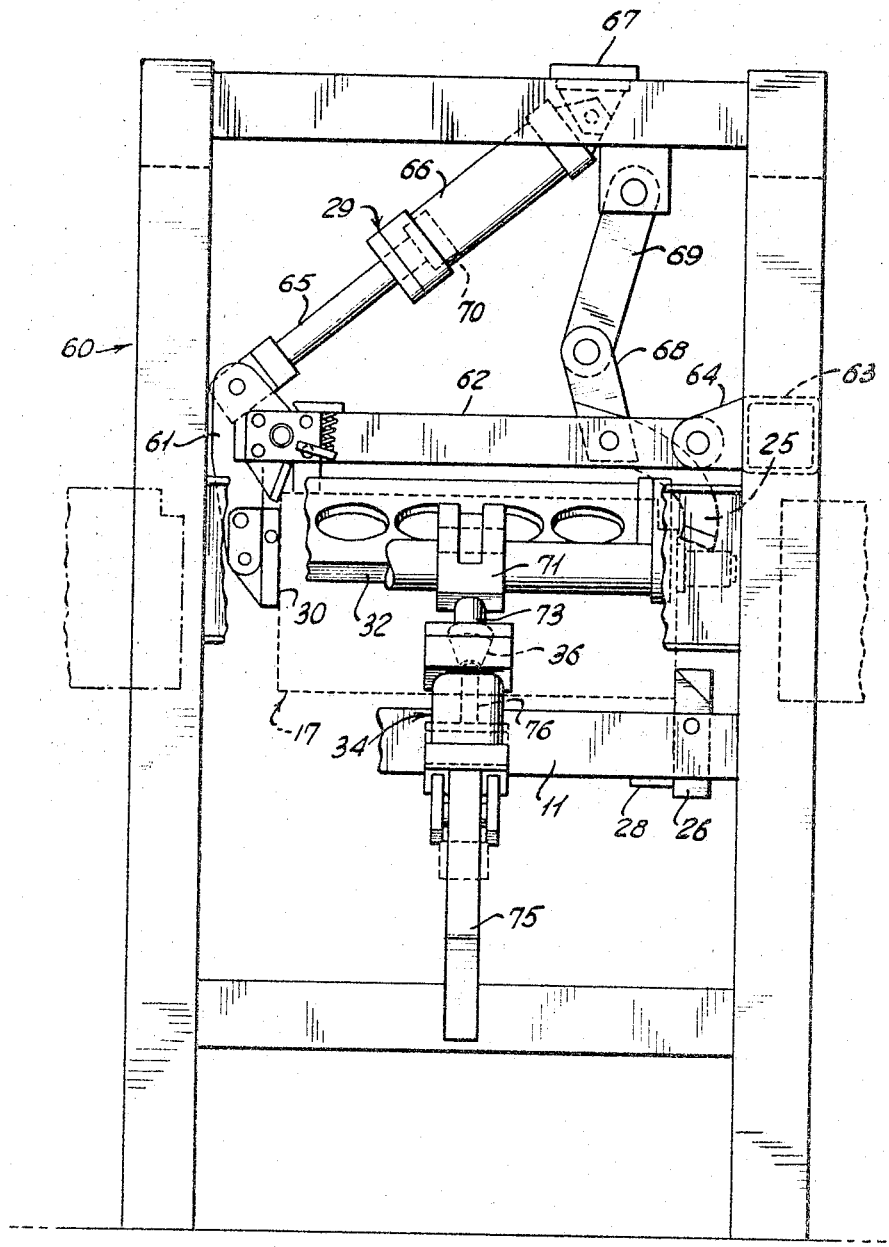
FIGURE 4 is a side elevational view of the apparatus at the testing station showing the engine block clamped in a testing position and the closure members operated to their closing positions.

FIGURES 3 and 4 of the drawing illustrates the detailed construction of the production line tracks 10 and 11, the indexing bars 12 and 13, the stop dogs 25 and 26 and closures 30, 31, 32, 35 and 36. As shown in FIGURE 3, the rails 10 and 11 are supported by angle iron beams 10a and 11a which, in turn, are supported by channel beams 10b and 11b as by welding or the like. Guide rails 10c and 11c are supported from the channel beams 10b and 11b by brackets 10d and 11d. The guide rails 10c and 11c project upwardly at the sides of the engine block casting C to guide it and restrain it from lateral movement. The lower stop dogs 26 are mounted to rock on the supporting channel members 10b and 11b.

Indexing bars 12 and 13 are connected together for reciprocation as a unit and the dogs 14 are pivotally mounted between the bars to freely rock in one direction and engage the stops 15 when rocked in the opposite direction.

The apparatus of the testing station 17 comprises an open gantry type frame 60 having upright stanchions and transverse beams connecting the stanchions to each other. The closure elements 30, 31, 32, 35 and 36 and their hydraulic operating rams 29, 33, 34, 37 and 38, illustrated diagrammatically in FIGURES 1 and 2, are shown in detail in FIGURES 3 and 4. The end closure pad 30 is of a soft yieldable material, such as rubber for engaging the surface of the casting around the port opening in the end of the block and sealing the port opening. Closure pad 30 is mounted at one end of a rocking arm 61, see FIGURE 4, pivotally mounted intermediate its end at the end of a radius beam 62. The opposite end of a radius beam 62 is pivotally connected to a bracket 63 on frame 60 and having a clevis 64. The end of the rocking arm 61 opposite the end mounting the closure pad 30 is pivotally connected to the end of a piston rod 65 of the hydraulic ram 29. The cylinder 66 of the ram, in turn, is pivotally connected to a bracket 67 at the top of the frame 60 for rocking movement thereon. Upper stop dog 25 is formed at the lower end of a link 68 pivotally mounted intermediate its ends on the radius beam 62 and having its opposite end connected to the end of a link 69 which, in turn, is pivotally connected to frame 60. Radius beam 62 has a pad 62a at its outer end adjacent the rocking arm 61 for engaging the top of the engine block casting C to limit the downward movement and cause arm 61 to rock on the end of the radius beam. Thus, when the piston 70 of ram 29 actuates rod 65 to the extended position illustrated in FIGURE 4, the piston rod 65 rocks the arm 61 on radius beam 62 to engage the pad 30 with the end of the engine block casting C to close the port and bodily move the block against the upper and lower stops 25 and 26. On the other hand, when the ram 29 is actuated to retracted position it first rocks the arm 61 to releasing position and thereafter rocks the radius beam 62 on bracket 63 to raise the arm and pad 30 thereon above the top of the engine block casting C and the pivoted links 68 and 69 swing the upper stop dog 25 upwardly so that the casting may move thereunder.

Top closure members 31 and 32 also are of the same relatively soft resilient material as the end closure 30 to engage the surface of the casting around the port openings. It will be understood that the top closure members 31 and 32 close the ports in the top of the casting C between the cylinder wall and jacket. Thus, the pads 31 and 32 have openings corresponding to the cylinder bores of the engine casting C, but close the ports between the cylinder bores and sides of the casting.

A flexible hose 56 is connected to the pad 32 for supplying a testing fluid to the interior of the chamber between the cylinder walls and jacket of the engine block casting C and has its other end connected to a solenoid operated control valve 58 mounted on the frame 60. A similar flexible hose 57 is connected at one end to the pad 31 and at its opposite end to a solenoid operated vent valve 59. Thus, when the valves 58 and 59 are open, a testing fluid may be supplied to the chamber in the engine block casting C which is vented through the vent valve 59. When the valves 58 and 59 are closed they trap the fluid therein.

Each of the pads 31 and 32 are operated by mechanisms of identical construction arranged in reverse order and generally similar to the construction for operating the end pad 30. Thus, a description of one will suffice for the other. As shown in FIGURE 3, the pad 31 is mounted on one end of a bell-crank 71 pivotally mounted intermediate its ends on a bracket 72 positioned between upright columns of the frame 60. The opposite end of the bell-crank 71 is pivotally connected to the end of a piston rod 73 of the hydraulic ram 33. The cylinder 74 of the hydraulic ram 33 is pivotally connected to a bracket 75 for rocking movement thereon. Thus, when the hydraulic rams 33 and 34 are operated to their retracted position, the pads 31 and 32 rock outwardly on the brackets 72 away from the top of the engine block.

Bottom closure members 35 and 36 are in the form of plugs at the ends of piston rods 76 and 77 of the hydraulic rams 37 and 38. The cylinders of the hydraulic rams 37 and 38 are rigidly mounted on the brackets 75 in position to engage the plugs 35 and 36 with the port openings in the bottom engine block casting for connection to the water circulating lines.

HYDRAULIC CIRCUIT AND CONTROLS

The hydraulic system and controls for actuating hydraulic rams 29, 33, 34, 35 and 36 are illustrated diagrammatically in FIGURE 5. Hydraulic fluid is supplied to the system by a pump 85 driven by an electric motor 86. Pump 85 receives hydraulic fluid from a source of supply 87 through a strainer 88. Pump 85 delivers hydraulic fluid at the pressure of, for example, 600 pounds per square inch to a main line 89 which supplies the hydraulic fluid to valves 29a, 33a and 37a, respectively. As stated above in the description of FIGURE 1, the hydraulic rams 33 and 34 are jointly controlled by valve 33a while hydraulic rams 37 and 38 are jointly controlled by a single valve 37a. The main supply line 89 also has an extension 89a which leads to a hydraulically operated tumbling mechanism for tumbling the engine block casting C at the blow off station 18 in FIGURE 1.

The control valves 29a, 33a and 37a are of identical construction and each comprises a plurality of valves. Thus, the description of the valve mechanism 29a will suffice for the valve mechanisms 33a and 37a which will be indicated by a corresponding reference character. Each valve mechanism comprises a reversing valve 29d operated by a hydraulically operated piston 29e. Thus, when the piston 29e is in the position illustrated in FIGURE 5, the hydraulic ram 29 is retracted and no fluid is being supplied to either side of the piston. When fluid is supplied to the right hand side of valve piston 29e to move it toward the left as viewed in FIGURE 5, hydraulic fluid flows from the main line 89 through a line 90 to the reversing valve 29 and from the reversing valve through the line 91 and restricting orifice 92 of a flow control device 93 to the left hand end of the cylinder 66 of the hydraulic ram 29 to operate the piston 70 and connecting rod 65 to extended position to the right. Flow restricting orifice 92 limits the speed of operation of ram 29 and is connected in parallel with a check valve 94 to permit flow from the cylinder in parallel with the orifice. Hydraulic fluid from the right hand side of the piston 70 in cylinder 66 flows through a line 95 and in parallel through a flow restrictor 96 and check valve 97 of a flow control device 98 identical with the flow control device 93. The hydraulic fluid then flows through a line 99 to the reversing valve 29d and through the reversing valve 29d and line 100 to a drain.

When hydraulic fluid is supplied to the left hand side of the piston 29e it shifts the reversing valve 29d so that hydraulic fluid from the main line 89 flows through the line 90, reversing valve 29d, line 99, orifice 96 of flow control device 98 and line 95 to the right hand side of the piston 70 of the ram 29 and operates the piston and connecting rod 65 to retracted position. Fluid from the left hand side of the piston 70 then flows through the flow restrictor 93, line 91, reversing valve 29d and line 100 to the drain.

The flow of hydraulic fluid to the opposite sides of the piston 29e of the hydraulic valve 29d is controlled by pilot valves 29f and 29g which, in turn, are actuated to operating position by the solenoids 29b and 29c, respectively, and to their inoperative position illustrated in FIGURE 5, by springs 105 and 106. Thus, when solenoid 29b is energized by the closing of the switches 40 and 41, see FIGURE 1, fluid from the main line 89 flows through a line 101, a passage through the pilot valve 29f and a line 102 to the right hand side of piston 29e. Fluid at the left hand side of piston 29e then flows through a line 103, a passage in pilot valve 29g, and a line 104 to the drain line 100. Thus, piston 29e operates the reversing valve 29d to initiate operation of the hydraulic ram 29 to its extended position to close the port opening in the end of the casting C and bodily move the casting against the stops 25 and 26, see FIGURE 2. Similarly, when solenoid 29c of the pilot valve 29g is energized the piston 29e operates the reversing valve 29d to actuate the hydraulic ram 29 to its retracted position. When either solenoid 29b and 29c is de-energized springs 105 and 106 moves its respective pilot valve to the position illustrated in FIGURE 5.

It will be obvious from the above explanation that the valve mechanisms 33a and 34a operate in the same manner to simultaneously operate the pairs of hydraulic rams 32, 33 and 36, 37, respectively. For this purpose the line 91 has separate branches 91a and 91b connected to flow control device 93a and 93b for hydraulic rams 33 and 34. Similarly, line 99 has branches 99a and 99b connected to the flow control devices 97a and 97b at the opposite ends of the hydraulic rams 33 and 34. Similarly, the hydraulic rams 37 and 38 are connected in parallel for simultaneous operation.

The ram 29 and pairs of rams 33, 34 and 37, 38 are operated successively and the operation of each pair is initiated by the preceding ram or pair of rams. As shown in FIGURE 5, the switch 43 is actuated by the operation of the hydraulic ram 29 to extended position to energize solenoid 33b for pilot valve 33f. As explained above, in the description of the circuit in FIGURE 1, a single valve 33a controls operation of the pair of hydraulic rams 33 and 34 and energization of solenoid 33b operates the rams to their extended position to move closures 31 and 32 to closing position. Similarly, the hydraulic rams 33 and 34 operate through their actuators 44 and 45 to close switches 46 and 47 in their extended position to close the circuit to the solenoid 37b for actuating the pilot valve 37f of the valve mechanism 37a. Actuation of the pilot valve 37f supplies hydraulic fluid to operate the rams 37 and 38 to their extended position to actuate the closure plugs 35 and 36 to closed position. Thus, the hydraulic rams 29, 33, 34 and 37, 38 are operated sequentially from each other to automatically actuate the closures 30, 31, 32 and 34, 35 to their closed position to form a sealed chamber in the engine casting C being tested. Operation of the hydraulic rams 37 and 38 to their extended position actuates switches 50 and 57 to closed position to automatically initiate operation of the testing mechanism.

Conversely, after a testing operation is completed, a switch 112 is an electric circuit to the solenoid 37c of the valve mechanism 37a is energized. Such energization operates the pilot valve 37g which, in turn, operates through the piston operator 37e to actuate the reversing valve 37d and move the hydraulic rams 37 and 38 to their retracted position. Closure of switch 112 also energizes a solenoid 110 for opening a switch 111 in the circuit to solenoid 37b to de-energize the latter and shift the pilot valve 37f to the position illustrated. Rams 37 and 38, in turn, operate switches 113 and 114 connected in a circuit to the solenoid 33c for operating the hydraulic rams 33 and 34 to their retracted positions and release the closure elements 31 and 32 from engagement with the engine casting C. Operation of the hydraulic rams 33 and 34 to retracted position operate switches 115 and 116 connected in series in a circuit for energizing the solenoid 29c of the pilot valve 29g of the control for the hydraulic ram 29. Upon energization of the solenoid 29c the hydraulic ram 29 is actuated to its retracted position to withdraw the closure element 30 from engagement with the end of the casting C to a position above the casting so that it may be advanced from the testing station 17 to the tumbling station 18. As the hydraulic ram 29 is actuated to its retracted position it closes a switch 118 and a circuit 119 for controlling operation of the transfer bars 12 and 13 to index the casting from station 17 to station 18. The switches 113, 114, 115, 116 and 118 are interlocked with the washing machine at station 16 to indicate that they are closed before the transfer mechanism operates.

TESTING APPARATUS

FIGURE 6 illustrates one form of apparatus for automatically testing an automobile casting C for leaks in accordance with the method of the present invention. In the description of the illustrated embodiment, the testing medium is presumed to be a liquid supplied to the closed chamber in the engine block casting C under pressure and comprises the same fluid used for washing the block at the washing station 6. A suitable washing solution is one containing a detergent Jem Kleen 30–S, available on the open market. This testing fluid has a low surface tension and bulk viscosity which adapts it to flow freely through even a small leak.

In the illustrated embodiment, the testing fluid is supplied from a tank 125 at the washing station 16 to a tank 126 at the testing station 17 by a pump 127, but it will be understood that the fluid can be directly supplied from tank 125. Test fluid is drawn from the tank 126 by a pump 128 and supplied at a relatively low pressure of, for example, 85 pounds per square inch to a supply line 129. A pressure relief valve 124 by-passes the pump 128 back to the tank 126 when the pressure exceeds 85 pounds per square inch. The testing liquid flows through filters 130 and 131 and then through a line 132 including a stop valve 133, the normally closed supply valve 52 and the normally open test control valve 58, see FIGURE 3. As shown diagrammatically in FIGURE 6, the end of the line 132 is the flexible hose 56 connected to the closure pad 31, see FIGURE 3, to supply the test fluid under pressure to the chamber in the engine block casting C to be tested. The other closure element 32 and flexible hose line 57 connected thereto is part of a drain line 135 including the normally open vent valve 59. Drain line 135 extends from vent valve 59 back to the tank 125. Manually operable valves 136 and 137 are provided in drain line 135 and by-pass line 138 for restricting flow therethrough. Thus, hydraulic testing fluid is supplied to the closed chamber in the engine block casting and is vented therefrom at a slow rate to remove air from the chamber when the normally closed supply valve 52 is opened.

A branch line 142 extends from the supply line 132 at a point between the normally opened control valve 58 and closure element 31. Branch line 142, in turn, is divided into separate branch lines 143 and 144 connected to close chambers or test cells 145 and 146. A normally open solenoid operated test valve 147 is provided in the branch line 143 to seal the test cell 145 when actuated to closing position. A normally open manually operated valve 148 is provided in the branch line 144. Thus, when the normally open control valve 58 and vent valve 59 are closed they trap testing fluid in the closed chamber in the engine block casting under pressure in communication with the test cells 145 and 146. When the normally open test valve 147 is closed it traps test fluid in the line 143 and cell 145 at its initial pressure and provides a standard for testing any reduction in pressure in the other cell 146 due to fluid leaking through the wall of the engine block casting C. Any difference in pressure in cells 145 and 146 is measured by an instrument 150 which regulates the pressure in a pneumatic system 151 directly proportional to the difference in pressure.

The pneumatic system comprises a line 152 having a pressure regulator 153 therein to maintain the air supplied to the measuring instrument 150 at a constant pressure. The measuring instrument 150 varies the pressure of the air leaving the instrument through a line 154 to various pressure responsive instruments including a pressure gauge 155 and a pressure responsive controller 156, later to be described more in detail. A three-way valve 158 is provided in the line 154 and is operable in one position to deliver pneumatic fluid to the pressure gauge 155 and pressure controllers 156, and operable in another position to connect the instruments to the atmosphere to re-set the instrument.

The measuring instrument 150 and cells 145 and 146 are combined in a single measuring instrument as illustrated in FIGURE 8. This instrument 150 comprises a housing 160 having a diaphragm 161 mounted therein to form the test cells 145 and 146 at opposite sides thereof. Thus, test fluid is supplied through the line 143 to the cell 145 and through the line 144 to the cell 146. The diaphragm 161 is connected to one end of a rod 162 which pivots at the point 163 where it projects from the cell through a diaphragm. Rod 162, in turn, is connected to a yoke 164 mounting a flapper valve 165 which cooperates with a nozzle 166 in an upright arm 167 projecting upwardly from the housing 160. The yoke 164 is also connected to a range bar 168 which depends from the yoke at the opposite side of the upright portion of the frame with its lower end subjected to the bias of a bellows 169. Pneumatic fluid is supplied at constant pressure through the line 152 to the closed housing of a relay 170 having a central plate 171 with an axial opening 172 therein. A diaphragm 173 at one side of plate 171 mounts a valve 174 at the opposite end of a stem 175 extending through the axial opening 172. The wall of the relay housing 170 adjacent the diaphragm 173 is connected to the nozzle 166 through a line 176 and the flow therethrough is controlled by a fixed orifice 177 in the relay housing and flap valve 165 at nozzle 166. Thus, the flow of air from supply line 152 and axial opening 172 is controlled by valve 174 to supply air to outlet line 154 connected to the axial opening at a pressure which is proportional to the difference in pressure in the cells 145 and 146.

A leak test is initiated and terminated by an electric control system illustrated in FIGURES 5 and 6 for actuating various control elements. The control system includes switches 50 and 51 actuated to closed position by the operation of the hydraulic rams 37 and 38 to their extended position, see FIGURE 5, and the switches are connected in series in a circuit 180 between power lines L and L1 and including a solenoid 181 for operating the normally closed supply valve 52 to open position. Thus, when all of the closures 30, 31, 32, 35 and 36 have been operated to closed position the test fluid is supplied to the chamber under pressure. The flow of testing fluid continues until a predetermined pressure, for example, 80 pounds per square inch, exists in the chamber, at which time a pressure operated switch 182 closes a circuit 183 including solenoids 184 and 185 for operating the normally open control switch 58 and vent switch 59 to closed positions. The testing fluid under pressure is then trapped in the closed chamber of the engine block casting C being tested and in the cells 145 and 146. Closure of switch 182 also energizes a solenoid 186 for operating switch 187 in the circuit 180 to release the supply valve 52 which moves to its closed position.

Closure of the pressure switch 182 also energizes three timing devices 190, 191 and 192 and a solenoid 193 in circuit 183. Timing devices 190, 191 and 192 are initiated when circuit 183 is energized and return to their initial position when de-energized. Timing device 190 operates a switch 194 after two seconds delay to energize the solenoid 195 and operate the valve 147 to closed position. The timing device then holds the switch 194 closed until circuit 183 is de-energized. Closing of valve 147 segregates the cell 145 from the cell 146 and traps the testing fluid under pressure therein at the initial testing pressure to provide a standard against which the pressure in cell 146 may be compared.

Timing device 191 operates a switch 196 connected to energize a circuit in the memory device 53 for a period of time corresponding to the delay in measuring the difference in pressure, for example, 8 seconds. Energization of solenoid 193 concurrently with timing device 191, actuates three-way valve 158 in the pneumatic circuit to supply fluid under controlled pressure to the pressure controller 156. Switch 196 cooperates with the pressure controller 156 which operates a switch 197 for sending a signal to the energized memory device during the 8 second period if the casting leaks and is to be rejected. Switch 197 is set to be actuated to closed position at 6 pounds pressure on the pressure responsive controller 156 and to re-set the switch at 3 pounds pressure in the pneumatic line. The pressure responsive controller 156 indicates that there is no leakage in the casting when 3 pounds pressure exists in the pneumatic line. In other words, 3 pounds pressure is the threshold limit for testing certain size holes in the engine block or other castings. The upper limit or pressure in the pneumatic system is 15 pounds per square inch corresponding to the leakage of a quantity of liquid of the order of .020 gallons per minute. Thus, a pressure of 6 pounds at which a casting is rejected permits the flow of approximately .009 gallon per minute. If, during the 8 seconds that the memory device 53 is energized the pressure in the pneumatic system exceeds 6 pounds per square inch, it closes switch 197 indicating that the casting is to be rejected and instructs the memory device 53 to divert the casting from the production line. After the rejected casting has moved past several subsequent stations, it is diverted from the production line under the control of the memory device 53 which energizes solenoid 23 to switch rail sections 19 and 20, see FIGURE 1. Simultaneously, the energization of the memory device 53 initiates the operation of the responsive device 54 to indicate on the casting that it is defective by printing legends thereon.

Timing device 192 terminates a testing cycle and re-sets the parts for the next cycle. Timing device 192 operates a switch 198 after a period of 10 seconds to energize a solenoid 199 to open a switch 200 in the branch circuit including the solenoid 185 for operating the vent valve 59 to release the fluid from the casting C. Simultaneously, the closing of switch 198 energizes a fourth timing device 201 which operates for a period of 10 seconds to maintain solenoid 199 energized and permit fluid to drain through the vent valve 59. Closing of the switch 198 also energizes a solenoid 202 for actuating a line switch 203 to open position in the branch circuit 180 for the supply valve 52 to insure that the supply valve is closed. During the draining of the fluid from the casting the timing device 201 operates a switch contact 204 into engagement with a segment contact 205 connected to one side of the line L1 to insure energization of the solenoids 199 and 202 independently of the timer switch 198. Simultaneously, switch contact 204 of the timing device 200 engages the contact 206 to energize the solenoid 207 to close switch 112 connected in series with contacts of pressure switch 182 to initiate operation of hydraulic rams 37 and 38 to retracted position as soon as the pressure switch reaches its low pressure setting. Timing device 201 automatically returns to its initial position after closing switch 112.

Opening of the vent valve 59 releases the pressure in the closed chamber in the engine block casting C which operates automatically to re-set the various parts. As the pressure in the engine block chamber falls, switch 182 is actuated to open position to de-energize the solenoid 185 for actuating the vent valve and de-energize the solenoid 185 for releasing the control valve 58 which return to their normally open position. Opening of switch 182 also de-energizes solenoid 186 for switch 187 in the circuit for the supply valve 52, but the circuit is held open by switch 203. Simultaneously, the opening of the switch 182 de-energizes the timing switches 190, 191 and 192 which return to their initial position and de-energizes the solenoid 193 to release the three-way valve 158 which is returned to its venting position illustrated in FIGURE 6 by spring 209. When valve 158 is in venting position the pressure responsive device 156 is returned by spring 210 to open switch 197. During the re-set, switch 200 in the circuit for operating the vent valve 59 and the switch 203 in the circuit for the supply valve 134 are held open by solenoids 199 and 202 which remain energized during the 10 second period of timing device 201 by the engagement of contact 204 with the segment 205. Closing of the switch 112 after a 10 second dwell then initiates the control system for the hydraulic rams 37 and 38 to withdraw the closure elements 30, 31, 32, 35 and 36 from engagement with the engine block casting C and the apparatus is ready for the next cycle of operation.

If a pneumatic testing fluid, such as air or helium, is used, the testing apparatus operates in exactly the same way as explained with respect to a liquid. A pneumatic air line 210 is connected to the line 132 between the valves 133 and 134 so that by closing stop valve 133, the pneumatic fluid is supplied to the closed chamber in the engine block casting C. If, instead of using a fluid under pressure, the closed chamber in the engine block C is evacuated to produce a difference in pressure, the vent line 57 is connected to a vacuum pump. The testing apparatus still operates in substantially the same way except that switches 182 and 197 would be operated by motors operating in a reverse direction and the other instruments would be designed accordingly.

MODE OF OPERATION

A cycle of operation for testing a particular casting C for leaks is initiated by the reciprocation of the indexing bars 12 and 13 which move the casting through the successive stations 16, 17 and 18 illustrated in FIGURE 1. At the station 16 the casting is washed and rinsed and then advanced by the bars 12 and 13 to the testing station 17.

The engine block casting C is moved to a position slightly forward of its ultimate testing position and the movement of the block closes the switch 40. Upon return movement of the indexing bars 12 and 13 an indexing lug 14 closes the switch 41. Upon closure of the switches 40 and 41 the hydraulic ram 29 is initiated which moves the closure 30 into engagement with casting C to close the port opening therein and move the casting rearwardly against the upper and lower stops 25 and 26 to hold the engine clamped therebetween. Operation of the hydraulic ram 29 closes switch 43 which initiates operation of the hydraulic rams 33 and 34 to move the top closures 31 and 32 into engagement with the engine block to seal the port openings therein. Operation of the rams 31 and 32, in turn, initiates switches 46 and 47 to initiate operation of the rams 37 and 38 to actuate the closures 35 and 36 into engagement with the port openings in the bottom of the casting. Thus, the closures 30, 31, 32, 35 and 36 form a closed chamber at one side of the walls of the casting to be tested.

After the closures have been moved to closed position the hydraulic rams 37 and 38 close switches 50 and 51 in an electric circuit to initiate a leak test. Referring to FIGURE 6, the closure of the switches 50 and 51 energize solenoid 181 for operating the normally closed supply valve 52 to open position. Fluid under pressure then flows through the flexible line 56 into the closed chamber in the engine block casting C and from the closed chamber through the flexible line 57, drain line 135 and normally open vent valve 59 therein to a drain. The manually operated throttle valve 136 regulates the flow through the drain line 135 to cause the pressure in the closed chamber in the casting C to increase until it reaches a predetermined pressure of, for example, 80 pounds per square inch when it closes switch 182. Closure of switch 182 energizes the solenoids 184 and 185 for operating control valve 58 and vent valve 29 to closed position. Simultaneously, the solenoid 186 is energized to open switch 187 in the circuit 180 to release supply valve 52 which moves to its normally closed position. Closing the control valve 58 and vent valve 59 traps the test fluid under pressure in the closed chamber of the engine block casting C under pressure and the test cells 145 and 146 communicating therewith through the lines 142, 143 and 144.

Simultaneously, the three timing devices 190, 191 and 192 and solenoid winding 193 are energized by closure of switch 182. Solenoid winding 193, when energized, operates the three-way valve 158 to supply pneumatic fluid as controlled by the testing instrument to the pressure responsive motor 156. Timing device 190 operates after two seconds to close switch 194 to solenoid 195 and close test valve 147. Closing of valve 147 segregates cell 145 from cell 146 and closed chamber in the engine block communicating therewith and traps the testing fluid in the cell 145 at the initial pressure constituting a standard. Timing device 191 operates immediately upon energization to close switch 196 to energize a circuit in the memory device 53. Timing device 191 maintains switch 196 closed for 8 seconds and if at any time during the 8 second period the motor 156 closes switch 197 it instructs the memory device 53 to reject the casting from the production line. Motor 156 is operated to close switch 197 in response to an increase in pressure of the pneumatic fluid as controlled by the measuring instrument 150 responsive to an increase in the difference in pressure in cells 145 and 146 resulting from the leakage of testing fluid through the wall of the casting. Memory device 53, when instructed to reject a casting during the 8 second period, operates to move track switch 19, 20, see FIGURE 1, to divert the rejected casting after it has moved through several successive stations. Simultaneously, the memory device 53 operates indicating mechanism 54 to stamp or otherwise mark the casting as rejected.

After the casting C has been accepted or rejected, the timing device 192 closes switch 198 10 seconds after initiation to open vent valve 59 and release the pressure in the chamber. Such release of pressure operates switch 182 to open circuit position which de-energizes the solenoids for the control valve 58 and vent valve 59, de-energizes the timing switches 190, 191 and 192 and de-energizes the solenoid 193 for three-way valve 158 and resets the parts to their initial position.

Closure of the switch 198 by the timer 192 initiates operation of timer 201 which maintains the vent valve 59 open for a period of 10 seconds to insure draining of testing fluid and release of pressure and energizes the solenoid 207 to close switch 112. Switch 112 connected in series with contacts of pressure operated switch 182 completes a circuit when the latter reaches its low pressure setting to initiate the operation of the hydraulic rams 37 and 38 in a reverse direction to withdraw the bottom closure plugs 35 and 36. When the closure plugs 35 and 36 have been withdrawn switches 113 and 114 are closed to initiate operation of the hydraulic rams 33 and 34 to withdraw the top closures 31 and 32. Upon withdrawal of top closures 31 and 32 the switches 115 and 116 are closed to initiate operation of the hydraulic ram 29 to withdraw the end closure 30 and move it out of the path of the casting C. Upon retraction of the hydraulic ram 29 switch 118 is closed to initiate the next cycle of operation. All of the closures having been retracted and all of the parts having been returned to their initial position the apparatus is ready to receive the next casting from the washing and rinsing station 16 for a leak test.

The apparatus is designed for a time cycle of 30 seconds to test and advance 120 castings or engine blocks per hour. Actually, the test time requires only 20 seconds leaving 10 seconds for operation of the closures. It is, of course, possible to either shorten or lengthen the time of a cycle of operation depending upon the demand for a given number of parts to be processed in a unit of time.

It will now be observed that the present invention provides a method of and apparatus for testing castings for leaks which will accurately detect a leak in a casting during its movement in a mass production line. It will also be observed that the present invention provides a method of and apparatus for leak testing which may be operated automatically to eliminate human error in evaluating test results and at a relatively low pressure as a safety factor. It will also be observed that the present invention provides an apparatus which is operated responsive to the movement of a casting to a testing station for rigidly clamping the casting for test and releasing the casting after a test has been completed. It also will be observed that the present invention provides an apparatus which operates automatically to accept or reject the tested casting and then re-set the mechanism for receiving the next casting for testing. It will still further be observed that the present invention provides an apparatus of the type indicated which is of rugged, compact construction and one which is reliable in operation.

While a single embodiment of apparatus is herein illustrated and described it will be understood that changes may be made in the construction and arrangement of elements without departing from the spirit or scope of the invention. Therefore, without limitation in this respect the invention is defined by the following claims.

What is claimed is:

1. Apparatus for testing castings for leaks comprising rails for supporting castings, an indexing mechanism for intermittently advancing castings along the rails, movable stop dogs for engaging the rearward end of a casting in the direction it is advanced by the indexing mechanism, a frame above the track, a clamping member mounted on the frame for movement from a position above the casting into engagement with the forward end of the casting in the direction it is advanced, and means for operating the clamping member into engagement with the forward end of the casting to move it bodily against the stop dogs at the rear of the casting and clamp it in a fixed position therebetween.

2. Apparatus for leak testing castings comprising a gantry frame, rails extending through the gantry frame for supporting castings, indexing mechanism for intermittently advancing castings along the rails, a stop dog for engaging the rearward end of a casting advanced by the indexing mechanism, and clamping means comprising a radius beam pivotally mounted at one end on the gantry frame, a clamping member pivotally mounted on the outer end of the radius beam for engaging the forward end of the casting, and means for rocking the radius beam downwardly over the casting and thereafter rocking the clamping member on the end of the radius beam into engagement with the forward end of the casting to move it bodily against the stop dog and clamp it therebetween.

3. Apparatus for leak testing castings comprising a gantry frame, rails extending through the gantry frame for supporting castings, indexing mechanism for intermittently advancing castings along the rails, and means for clamping a casting in fixed position in the frame comprising a radius beam pivotally mounted to the frame at one end, a stop dog mounted on the radius beam for engaging the rearward end of a casting advanced by the indexing mechanism, a clamping member pivotally mounted adjacent the end of the radius beam for movement into engagement with the forward end of the casting, and means for rocking the radius beam downwardly over the top of the casting and thereafter rocking the clamping member into engagement with the forward end of the casting to move it bodily against the stop dog depending from the radius beam.

4. Apparatus for leak testing castings comprising a gantry frame, rails extending through the gantry frame for supporting castings, indexing means for intermittently advancing castings along the tracks, and means for clamping a casting at a fixed position in the frame comprising a radius beam pivotally mounted to the frame at one end for rocking movement from a raised angular position above the casting to a lowered position overlying a casting advanced by the indexing mechanism, a stop dog pivotally mounted intermediate its end on the radius beam and having one end projecting below and its opposite end projecting above the beam, a link pivotally connected to the upper end of the stop dog and the frame, a clamping member pivotally mounted intermediate its ends at the outer end of the radius beam, and means for rocking the radius beam from a position above to a position overlying the top of the casting to move the stop dog to a position at the rear of the casting and thereafter rocking the clamping member on the radius beam whereby to clamp the casting between the stop dog and clamping member.

5. Apparatus for leak testing castings comprising a gantry frame, rails extending through the gantry frame for supporting castings, indexing mechanism for intermittently advancing castings along the tracks, movable stop dogs for engaging the rearward end of a casting advanced by the indexing mechanism, closure members mounted on the frame for movement toward and away frame the casting, means for actuating the closure members to an operative position in engagement with the casting and to an inoperative position away from the casting, and at least one of the closure members being mounted on the gantry frame for movement in a direction opposite the direction of movement by the indexing mechanism for closing an opening in the casting, engaging the end of the casting opposite the stop dogs and moving it bodily against the stop dogs to clamp it therebetween.

6. Apparatus for leak testing jacketed engine block castings having ports at the forward end, top and bottom, respectively, comprising a gantry frame, rails extending through the gantry frame for supporting castings, indexing mechanism for intermittently advancing castings along the rails, movable stop dogs for engaging the rearward end of a casting advanced by the indexing mechanism, closure members mounted on the frame for movement toward and away from the engine block to close the ports in the end, top and bottom of the casting, and the closure for engaging the port in the end of the casting bodily moving the casting against the stop dogs to clamp the casting therebetween.

7. Apparatus for leak testing castings in accordance with claim 6 in which each of the closure members is operated by an individual hydraulic ram.

8. Apparatus for leak testing castings in accordance with claim 7 in which control mechanism is provided for operating the rams successively to close the port opening in the end of the casting and clamp the casting between the closure and stop dogs and thereafter engage the top and bottom closures with the casting.

9. Apparatus for leak testing castings in accordance with claim 8 in which the control means comprises electromagnetically operated hydraulic valves for the hydraulic rams, and an electric control circuit having switches operated by each ram and connected to energize the electromagnetic hydraulic valves successively.

10. Apparatus for leak testing jacketed engine block castings having ports at the forward end, top and bottom, respectively, the combination of a gantry frame, rails extending through the gantry frame for supporting castings, indexing mechanism for intermittently advancing castings alongs the rails, a radius beam having one end pivotally mounted on the frame for rocking movement from a raised position above the casting to a lowered position overlying the casting, a stop dog depending from the radius beam for engaging the rearward end of a casting advanced by the indexing mechanism, a closure member pivotally mounted on the end of the radius beam for engaging the port opening in the end of the casting and clamping the casting between it and the stop dog, closure members pivotally mounted on the frame at each side of the casting for closing the port openings therein, closure members mounted on the frame for movement into engagement with the port openings at the bottom of the casting, each of the closure members having a hydraulic ram for operating it toward and away from the casting, electromagnetically operated valves for controlling the hydraulic rams, an electric circuit connecting the electromagnetically operated valves, a switch operated by the hydraulic ram for operating the closure member into engagement with the end of the casting for energizing the electromagnetically operated valves for the side closures, and electric switches operated by the operation of the hydraulic rams for side closures for energizing the electromagnetically operated valves for the bottom closures whereby the closures are moved successively into and out of engagement with the engine block casting.

References Cited by the Examiner

UNITED STATES PATENTS

| | | | |
|---|---|---|---|
| 1,572,158 | 2/1926 | Mueller | 73—46 |
| 2,559,369 | 6/1951 | Phillips | 198—19 |
| 2,667,062 | 1/1954 | Johns | 73—41 |

LOUIS R. PRINCE, *Primary Examiner.*

S. C. SWISHER, *Assistant Examiner.*